Figures 1, 1A:
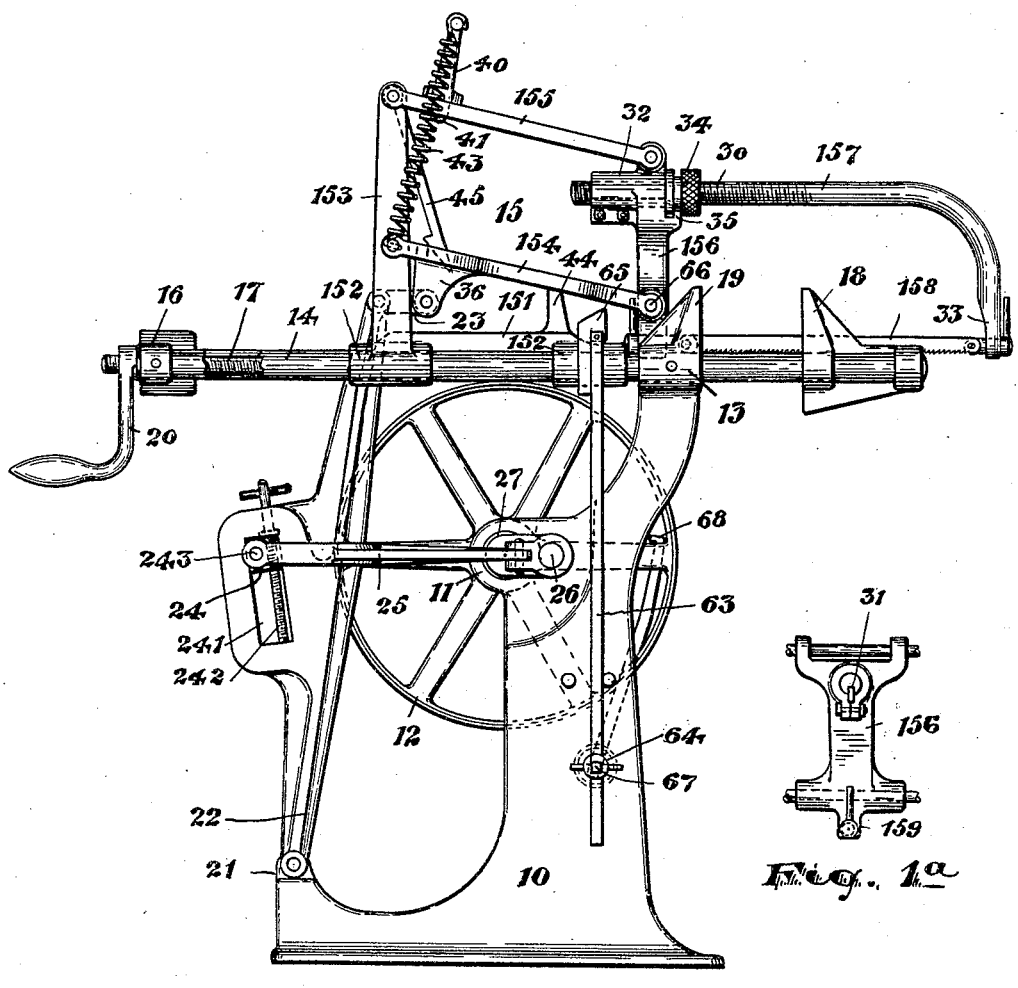

No. 773,924. PATENTED NOV. 1, 1904.
A. W. CASH.
POWER HACKSAW.
APPLICATION FILED OCT. 22, 1903.
NO MODEL. 3 SHEETS—SHEET 1.

WITNESSES:
Ralph Lancaster
Russell M. Everett

INVENTOR
Arthur W. Cash,
BY
Charles H. Pell
ATTORNEY

No. 773,924. PATENTED NOV. 1, 1904.
A. W. CASH.
POWER HACKSAW.
APPLICATION FILED OCT. 22, 1903.
NO MODEL. 3 SHEETS—SHEET 2.
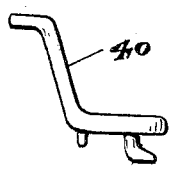
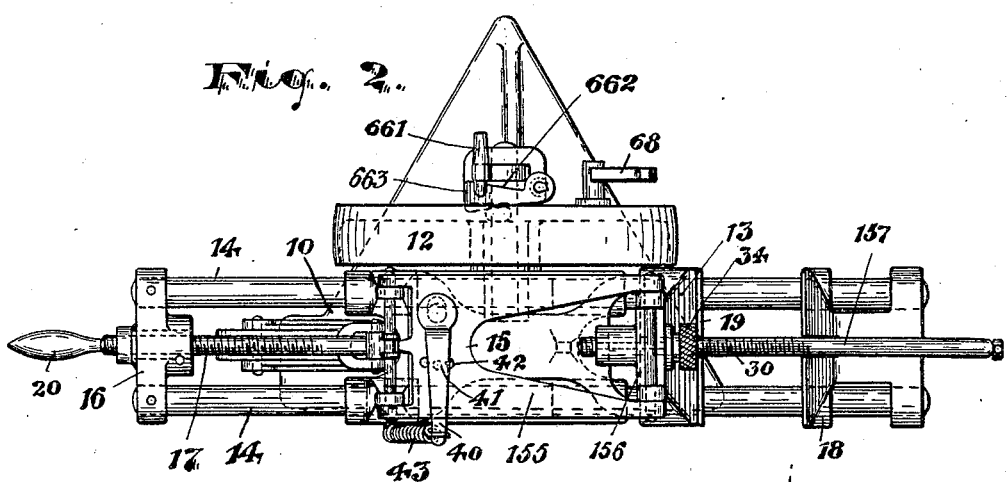
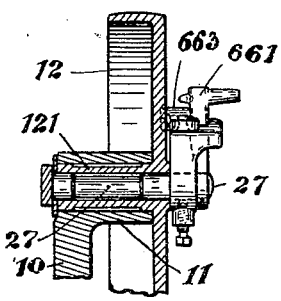
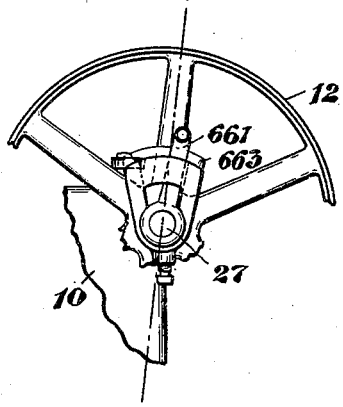
WITNESSES:
Ralph Lancaster.
Russell M. Everett.
INVENTOR:
Arthur W. Cash,
BY
Charles H. Pell
ATTORNEY.

No. 773,924. PATENTED NOV. 1, 1904.
A. W. CASH.
POWER HACKSAW.
APPLICATION FILED OCT. 22, 1903.
NO MODEL. 3 SHEETS—SHEET 3.

WITNESSES: INVENTOR:
Ralph Lancaster. Arthur W. Cash,
Russell M. Everett. BY
Charles H. Pell
ATTORNEY.

No. 773,924. Patented November 1, 1904.

UNITED STATES PATENT OFFICE.

ARTHUR W. CASH, OF NEWARK, NEW JERSEY.

POWER-HACKSAW.

SPECIFICATION forming part of Letters Patent No. 773,924, dated November 1, 1904.

Application filed October 22, 1903. Serial No. 178,040. (No model.)

*To all whom it may concern:*

Be it known that I, ARTHUR W. CASH, a citizen of the United States, residing at Newark, in the county of Essex and State of New Jersey, have invented and produced new and original Improvements in Power-Hacksaws; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The objects of this invention are to secure in a power-hacksaw greater efficiency, rapidity of execution, and economy both in power and in durability of the working parts; to reduce the dead-weight on the saw-blade during its return stroke, but to maintain a constant and uniform weight and tension on the said blade during its effective stroke; to secure a downward thrust of the blade upon the work during the cutting stroke and to relieve the blade of unnecessary weight and pressure during the return stroke, whereby the sharpness of the teeth is maintained for a longer period; to enable various pressures to be imposed upon the work, so that when the saw is sharp a limited pressure may be applied and as the saw becomes dull the pressure may be increased from time to time; to enable the length of the stroke of the saw to be increased or diminished from time to time and, if desirable, to permit the changes in the length of the stroke to be made without stopping the machine; to secure greater convenience in inserting the stock or work in its bearings in the machine and removing it therefrom; to enable the machine to be stopped automatically at a predetermined moment or point in its operations, whether the stock or work is cut entirely through or not; to reduce the cost and simplify the construction, and to secure other advantages and results, some of which may be referred to hereinafter in connection with the description of the working parts.

The invention consists in the improved hacksaw and in the arrangements and combinations of parts of the same, all substantially as will be hereinafter set forth and finally embraced in the clauses of claim.

Figure 5:
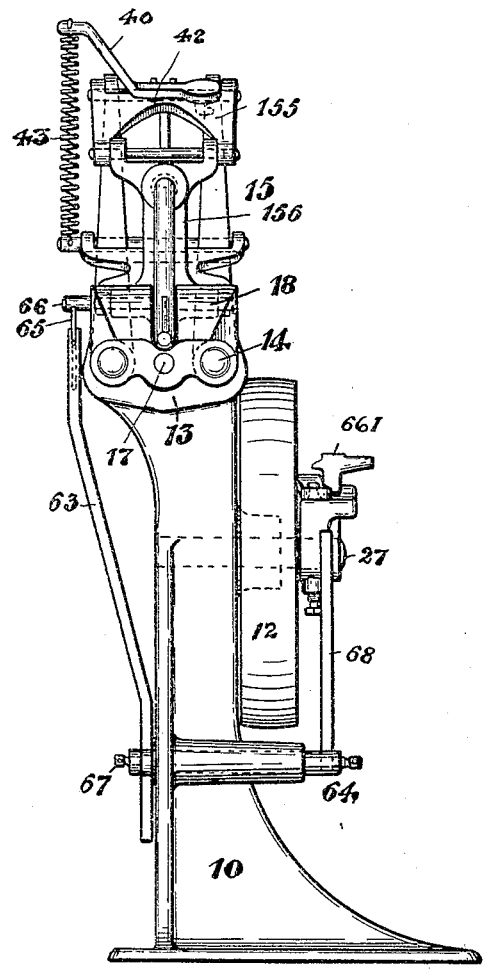
Figure 6:
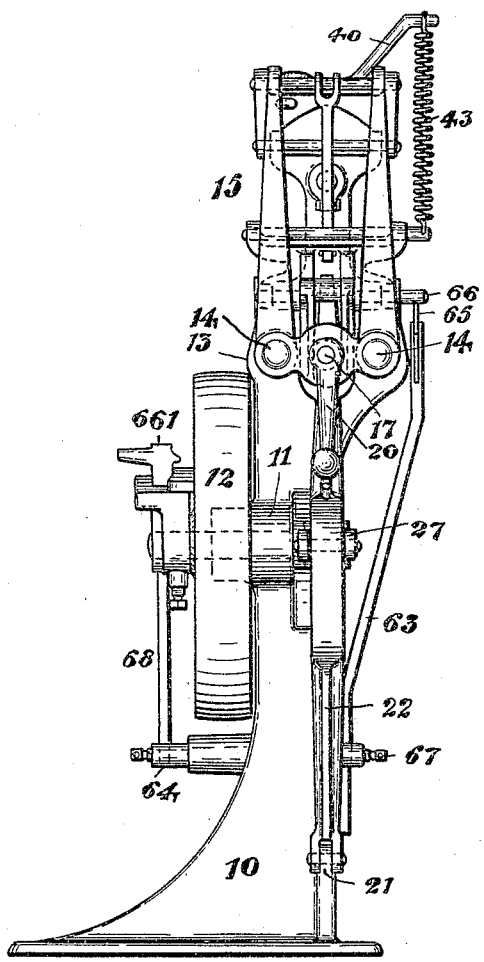

Referring to the accompanying drawings, in which like numerals of reference indicate corresponding parts in each of the several figures, Figure 1 is a rear view of my improved device. Fig. 1ª is a detail face view of a certain connecting-piece in the saw-blade carriage. Fig. 2 is a plan of the machine. Fig. 2ª is a detail elevation of a lever for regulating the pressure of the saw. Fig. 3 is a detail front elevation of a certain power-pulley, crank-shaft, and clutch. Fig. 4 is a detail section of said pulley and contiguous parts, and Figs. 5 and 6 are opposite end views of the machine.

In said drawings, 10 indicates a main frame or stand having at 11, integral with a triangular base, a box or bearing for the hub 121, Fig. 4, for the power-pulley 12, and at the upper end bearings 13 for a pair of horizontal and parallel bars 14 14, said bars being rigidly secured in said bearings and providing a slideway for the reciprocating saw-carriage 15, vise-head or jaw 18, and a support for the screw-head 16. At one end of the machine the bars 14 are connected by the rigid and fixed cross-head 16, above referred to, in which a screw-shaft 17, centrally located between said bars 14 14, has its bearings, while at the opposite end of the machine said bars 14 project beyond the bearings 13 to form slideways for the said vise-head or clamping-jaw 18, said jaw coöperating with a jaw 19 on the bearings 13 to clamp the work to be wrought upon in place. The cross-head 16 is provided with a socket or groove to receive the hand nut or crank 20, and said screw-shaft is connected with the sliding jaw 18, so that when said shaft 17 is operated by the hand nut or crank 20 the said jaw 18 will be moved to or from clamping relation to the fixed jaws 19 of the stand. At or near the bottom of the stand the same provides fulcrumal bearings 21 for a lever 22, which extends upward from said bearings 21 and between the shafts or bars 14 to a connecting-rod 23, arranged in connection with the saw-carriage. Between the said fulcrum 21 and bars 14 the said lever 22 provides adjustable bearings 24 for a connecting rod or piece 25, which extends to a crank-pin 26 on the crank-shaft 27, adapted to be clutched to the power-pulley. To permit of the proper adjustment of the bearing 24, the latter is preferably arranged to slide in a slot 241 of the lever 22, the sliding movements being controlled by a hand-screw 242. The bearing is preferably a block having a pivotal bearing-pin 243. The object of the sliding bearing-block 24 is to change the length of movement of the upper end of the lever 22 and the carriage reciprocated thereby, and thus increase or diminish the stroke of the saw-blade.

The sliding saw-carriage 15 comprises a bed portion 151, having boxes or bearings 152 for the shafts or bars 14 and having vertical arms or extensions 153, a pair of parallel arms 154 155, pivoted on said arms or extensions and extending approximately horizontally therefrom, a connecting-piece 156, pivoted on both of said arms 154 155 at their extremities opposite those pivoted on the arms 153, and the saw-back or extension-arm 157, the saw-blade 158 being caught at one end by the downwardly-extending extremity of the saw-back and the opposite end of said saw-blade being caught by suitable catching means 159 at the lower end of the connecting-piece 156. Said saw-back is threaded at its straight end 30 and thereat grooved longitudinally to receive a key or spline 31, Fig. 1ª, adapted to prevent said saw-back from turning. Said saw-back at said straight end slides longitudinally in a socket or long guiding-box 32, formed on the connecting-piece 156, said socket holding said saw-back in proper horizontal relation and being provided interiorly with the spline 31, Fig. 1ª, fitting in the longitudinal groove of the saw-back, by which said saw-back at its projecting and downwardly-extending end 33 is held in proper alinement or relation to the saw-blade catching or holding means 159 on the connecting-piece 156. The curved end of said saw-back provides a resilient seat for the saw-blade, whereby the latter may be held under high tension, but preventing said saw-blade from being strained beyond its tensile strength, and thus broken under certain conditions.

The saw-back 157, at its threaded end, is provided with an adjusting-nut 34, by which said back is moved longitudinally in its socket to increase or diminish the tension of the blade. The adjustable tension arm or back permits saw-blades of different lengths to be secured in the carriage to suit differences in the work wrought upon. Said nut 34 is peripherally grooved to receive a tongue 35, formed on the connecting-piece, by which said nut is held close to said connecting-piece, as will be understood.

The lower arm 154 of the carriage 15 is of a lever-like construction and is provided on the under side with a downward arm or extension 36, providing at its extremity suitable pivotal bearings for the link or connecting-rod 23, before referred to, which connects said arm 154 with the main driving-lever 22.

The saw-blade is fed down to the work or stock by means of the weight of the extension arm or back 157, connecting-piece 156, and parallel arms 154 155, as also by the pulling-down action of the main lever 22, acting through the link 23 on the downward extension or arm 36 of the lever-like arm 154. The teeth of the saw-blade, as shown in Fig. 1, project toward the lever 22, and thus the effective stroke of the saw is performed when the lever 22 pulls on the arm 36 of the saw-carriage and thus draws said carriage downward. The return stroke of the saw results from the pushing action of the lever 22 on the lever-arm 36, by which the arms 154 155, connecting-piece 156, and saw back and blade are somewhat lifted or raised and the saw-blade relieved of the dead-weight of said parts. Thus the said saw-blade is relieved of unnecessary friction on its return stroke and the dulling effect of such friction is avoided and power is economized.

A spring-lever 40 is adjustably connected to the upper arm 155 and is held against voluntary sidewise movement by the spring-tension detent 41, formed on the under side of said lever 40 and adapted to enter either one of a series of holes or depressions 42 in said arm 155. By returning the lever 40 on its fulcrum in one direction or the other the tension of the spring 43 is increased or diminished, thus also increasing or diminishing the pressure of the saw-blade upon the work and enabling the pressure to be increased as the teeth become dull. The downward movement of the arm 154 and its movable connections is limited by a lug or stop 44, Fig. 1, on the bed portion of the sliding carriage, whereby the downward movement of said parts will come to a stop immediately after the saw has cut through the work, and a pivoted pawl 45, having a hook or catch tooth at its free end, serves to hold the parallel arms and connections in a raised position when desired, said pawl extending at its free end through the arm 154 and being adapted to catch on the under side thereof when the parts are sufficiently elevated.

Again referring to Fig. 1, 63 indicates an adjustable stop-lever, at its lower end being adjustably seated in a fulcrumal rocking shaft 64, journaled in the frame or bed 10, and at its upper end having a pivotal catch-dog 65, adapted to engage with a projection such as the pivotal pin or rod 66 of the carriage. A suitable binding or set screw 67 holds the lever 63 adjustably but rigidly in its fulcrum.

It will be seen that the catching dog or latch 65 of the stop-lever 63 may be raised to contact with the pin 66 at any desired height as said pin moves horizontally back and forth with the carriage, and thus by properly adjusting the said dog or latch 65 when the saw has only partially cut through the work it may be stopped, as follows: The rocking shaft 64 carries at the opposite side of the frame 10 from the lever 63 a pawl 68, the upper end of which when the pin 66 contacts with the dog or latch engages the outer end of the rotating clutch-lever 661 and unlocks the said clutch, so as to permit the power-pulley to move free of the crank-shaft 27 and its connections, and thus become an idle pulley, as will be understood. This unlocking action is due to certain inclines 662, Fig. 2, of the clutch permitting the clutch-jaw 663 to release itself from holding contact with a spoke of the wheel 12 in any manner common in clutches.

In operation, power having been applied to the wheel 12 and the clutch being thrown into holding engagement with the wheel 12, the crank pin and shaft 26 27 are operated and reciprocal movement is imparted, through the connection 25, to the lever 22, which movement is transmitted to the carriage 15 and saw-blade 158, as already described.

I am aware that various modifications and changes in the arrangements and detail constructions of parts may be made without departing from the spirit and scope of the invention, and I do not wish to be understood as limiting myself by the many positive descriptive terms or expressions employed in describing the preferred construction illustrated in the drawings.

Having thus described the invention, what I claim as new is—

1. In a power-hacksaw, the combination with the bed-frame, or stand, carrying slideways, of a carriage arranged on said slideways, a lever linked to said carriage to drive the same, said carriage comprising a bed portion having a vertical arm, a pair of parallel arms pivoted on said arm and a connecting-piece having a saw-back adapted to receive and hold the saw-blade, substantially as set forth.

2. In a power-hacksaw, the combination with a frame having a horizontal slideway at the top thereof and a fulcrum bearing at the bottom thereof, a carriage arranged on said slideway, a lever fulcrumed on said fulcrum-bearing and extending up above said slide, a carriage arranged on said slideway and comprising a bed portion having a vertical arm, a pair of parallel arms pivoted on said vertical arm and at their ends opposite the vertical arm being pivotally connected by a connecting-piece parallel with said vertical arm, a saw-back arranged on the said connecting-piece, a connection of the upper end of the lever with the carriage and means for oscillating the lever.

3. In a power-hacksaw, the combination with a main frame or stand having near the bottom a fulcrum-bearing, and at its upper end bearings for a pair of horizontal bars and below the last said bearings a hub-bearing, a lever pivoted at its lower end on said fulcrum-bearing, said lever having adjustable bearings for a connecting-rod, a power-pulley having its hub or pivotal shaft in said hub-bearing and having a crank, a connecting-rod extending from said crank to the adjustable bearing of the lever, means for adjusting the bearing with respect to said lever, a pair of horizontal bars rigidly secured on the upper bearings of the frame, a saw-carriage on said horizontal bars and a link connecting the upper end of the lever with said carriage, and means for clamping the work to be operated upon, substantially as set forth.

4. In a power-hacksaw, the combination with the bed-frame having parallel bars at the top, a clamp on said bars and means for operating said clamp, of a carriage arranged on said bars and comprising a bed portion bearing directly on said parallel bars, a vertical arm extending up from said bed portion, parallel arms extending from said vertical arm, the lower one of which has a downwardly-extending arm, said parallel arms at their free ends being connected by a connecting-piece having a box or socket, a saw-back therein, means on said connecting-piece for holding a saw, a lever, a link connecting said lever and downwardly-extending arm of the carriage and means for oscillating said lever, substantially as set forth.

5. The improved hacksaw, comprising a stand or frame having parallel bars and a stationary clamping-jaw, a sliding jaw coöperating with the stationary jaw, a screw-shaft adapted to effect a movement on said sliding jaw, a carriage slidable on said parallel bars and comprising a bed portion bearing directly on said parallel bars, parallel arms pivoted on said bed portion, a connecting portion pivoted upon said parallel arms, a saw fixed to said connecting portion, one of said parallel arms having an arm extending therefrom, an operating-lever linked to the last-mentioned arm, and means for oscillating said lever, substantially as set forth.

6. The improved hacksaw comprising a stand or frame having at its upper end bearings for parallel bars and a fixed jaw 19, said parallel bars extending oppositely from said bearings and at one end providing slideways for a carriage and at the opposite end a slideway for a sliding jaw, said sliding jaw arranged on said parallel bars and coöperating with the fixed jaw of the frame to hold the work, means for operating said sliding jaw, a saw-carriage sliding on said stand or frame and consisting of a bed portion, parallel pivotal arms, a connecting-piece and a saw-back, a lever linked to one of the parallel arms eccentric to a pivot thereof, means for oscillating the lever, substantially as set forth.

7. In a hacksaw, the combination with means for holding the work, of a reciprocating saw-blade carriage comprising a bed portion having the extension 153, parallel pivoted arms, a connecting-piece and a saw-back adapted to receive the saw-blade, an adjustable arm 40, and a spring connected to said arm 40, engaging the carriage and adapted to effect a downward pressure of the blade upon the work, substantially as set forth.

8. In a hacksaw, the combination with means for holding the work, of a reciprocating carriage comprising a bed portion having an upward extension, parallel arms pivoted at one of their ends to said upward extension, one of which arms having on its under side, extending downward therefrom below its pivotal connection with said upward extension, an arm 36, a connecting-piece having a box or socket, a saw-back, arranged in said box or socket, means for adjusting said saw-back in its socket, and carriage-reciprocating means connected to the arm 36, to effect a pressure of the saw in a direction perpendicular to the line of its cutting movement, substantially as set forth.

9. In a hacksaw, the combination with means for holding the work, of a reciprocating carriage comprising a bed portion having means to receive and pivotally support a pair of parallel arms, said parallel pivotal arms movable with said bed portion, one of which arms has a downwardly-extending arm providing a bearing for a link, a connecting-piece having a box or socket with a projecting tongue adapted to receive a longitudinal slidable saw-back, and means for fastening said saw-back within said box or socket and means in connection with said downwardly-extending arm for reciprocating the carriage.

10. In a saw-back, the combination with means for holding the work, of a reciprocating carriage having a saw-blade moving therewith and having a projection 66, adapted to engage automatic stopping means, means for reciprocating said carriage, a driving-pulley having a tubular hub, a crank-shaft extending through said hub and carrying a clutch adapted to engage the spokes of the driving-pulley, said clutch having a releasing-arm, and means adapted to be engaged by the reciprocating carriage and operated to contact with the releasing-arm of the clutch, substantially as set forth.

In testimony that I claim the foregoing I have hereunto set my hand this 5th day of October, 1903.

ARTHUR W. CASH.

Witnesses:
   CHARLES H. PELL,
   RUSSELL M. EVERETT.